Sept. 9, 1952        C. M. RHODIN        2,609,593
LATHE TOOL HOLDER
Filed Jan. 29, 1951        2 SHEETS—SHEET 1
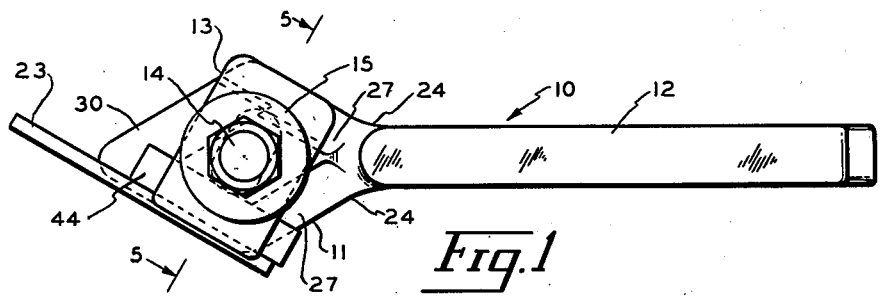
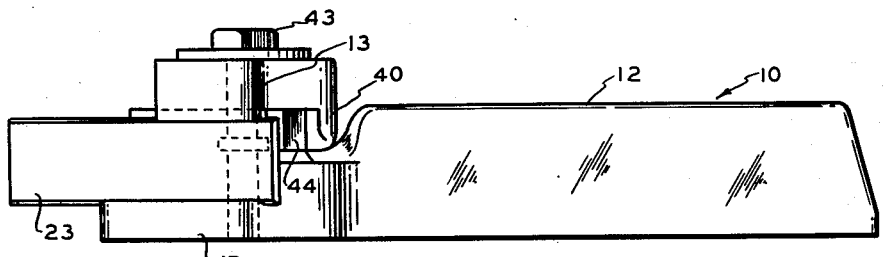
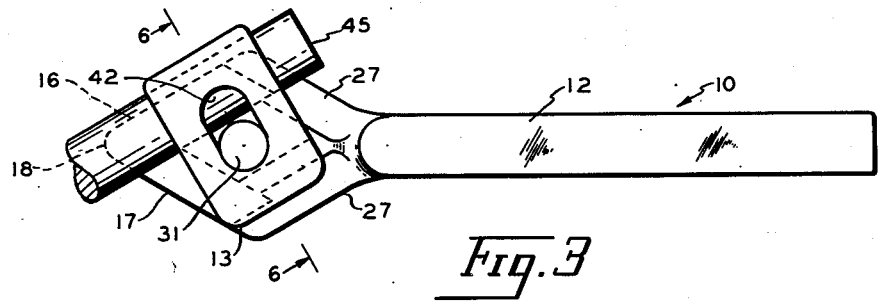
INVENTOR
CARL M. RHODIN
BY *Gustave Miller*
ATTORNEY Sept. 9, 1952 — C. M. RHODIN — 2,609,593
LATHE TOOL HOLDER
Filed Jan. 29, 1951 — 2 SHEETS—SHEET 2

INVENTOR
CARL M. RHODIN
BY Gustave Miller
ATTORNEY

Patented Sept. 9, 1952

2,609,593

UNITED STATES PATENT OFFICE 2,609,593

LATHE TOOL HOLDER

Carl M. Rhodin, Newport, R. I.

Application January 29, 1951, Serial No. 208,295

5 Claims. (Cl. 29—96)

This invention relates to a lathe tool holder and has for an object to provide an improved lathe tool holder that will interchangeably accommodate a wide variety of tools, thus making the one tool holder of this invention take the place of a multiplicity of tool holders as now in use.

A further object of this invention is to provide an improved lathe tool holder for accommodating a variety of tools either right handed or left handed as may be needed or desired according to the particular type of tool and the particular type of work being produced.

Yet a further object of this invention is to provide a tool holder that will accommodate various sizes of tool bits round, square, or rectangular in cross section, one size of tool holder of this invention accommodating tool bits from $\frac{3}{16}$ of an inch to ½ inch in size in both right hand and left hand positions.

Still a further objection of this invention is to provide a tool holder as above set forth which in one form may also be used for holding a cutoff tool, which added feature in no way interferes with any of the aforesaid functions.

Yet a further object of this invention is to provide a tool holder having a specially shaped head integrally extending from the tool shank and a specially shaped complementary and cooperating clamp having an elongated slot through which is secured a stud screw with a washer between the stud screw head and the clamp slot, thus making the entire assembly consist of no more than four cooperating parts.

Yet a further object of this invention is to provide a tool holder for interchangeably holding a multiplicity of tools in either right or left hand position, which tool holder is an improvement over the tool holders shown in U. S. Patents Nos. 1,250,154; 1,396,180; and 1,575,314 amongst others.

Still a further object of the invention is to provide a specially designed tool holder head shaped somewhat like an arrowhead wherein the two forward sides have vertical walls and the two rearward sides adjacent the shank have angular walls approximately at a 45 degree angle, and the securing clamp has a toe at one end having vertically extending inner and outer walls and a slightly angular bottom edge and at its opposite end has a depending foot having an angular complementary cushion having an angle complementary to the angle on the rear walls of the tool head, and has an elongated slot extending from the front toe toward the rear foot thereby permitting the clamp to automatically adjust its position to accommodate various size and shape tools with the angular inside walls of the foot complementing and cooperating with the angular wall on the rear of the tool head.

Still a further object of this invention is to provide a tool head somewhat arrow shaped in outline and arranged on its forward surfaces with two cooperating walls spaced from the ends of the tool head to receive a tool bit therein and be secured in such position by the cooperating clamp secured thereover.

With the foregoing and other objects in view, this invention comprises the combination, construction and arrangement of parts hereinafter set forth, claimed and disclosed in the accompanying drawings, wherein:

Fig. 1 is a top plan view of the tool holder of this invention with a cutoff tool secured thereon;

Fig. 2 is a view of Fig. 1 looking to the left hand side thereof;

Fig. 3 is a top plan view of a slightly modified form wherein the cutting off tool arrangement is omitted and showing a round tool secured thereon;

Figure 6:
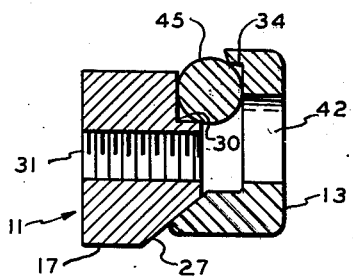
Fig. 6 is a sectional view on line 6—6 of Fig. 3.
Figure 7:
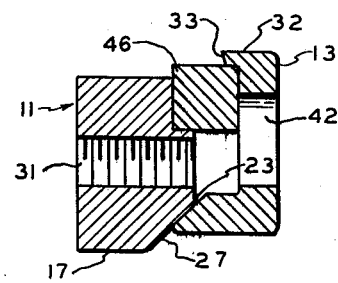
Fig. 7 is a sectional view similar to Fig. 6 but with a tool square in cross-section held therein.
Figure 8:
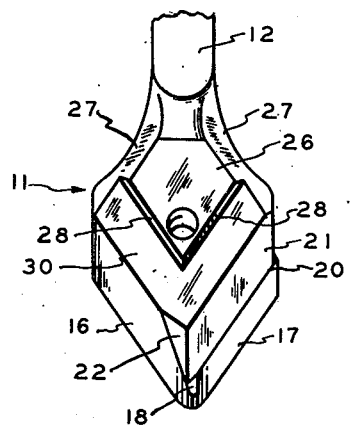
Fig. 8 is a perspective view of the tool holder head.
Figure 9:
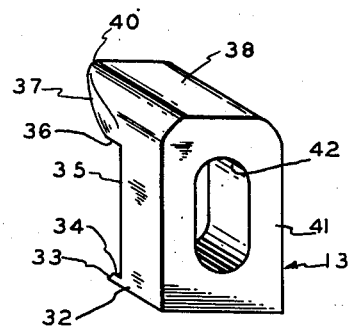
Fig. 9 is a perspective view of the tool securing clamp.

There is shown at 10 the tool holder of this invention. This tool holder 10 comprises a tool holder head 11 from which a shank 12 integrally extends, a tool holding clamp 13, a clamp screw 14 and a washer 15. The tool holding head 11 is shaped somewhat like an arrow having its forward walls 16 and 17 at an angle of approximately 60 degrees to each other as shown, although this angle may be varied within reasonable limits up to approximately 80 degrees. The front corner of the angle between walls 16 and 17 is preferably rounded as at 18. As shown in Figs. 3, 6, and 7 this wall 17 may extend vertically the same height as the wall 16 but in Figs. 1, 2, 4, 5 and 8, the wall 17 is made short and stops at an angular cut-back step 20 providing a step-back vertical wall 21 and the rounded point 18 is cut off in a bevel 22 between walls 21 and 16 as shown. This angular step 20 and stepped back wall 21 is intended particularly for cooperating with a cutting off tool such as shown at 23. The two rear walls 24 of the head 11 are connected to the top floor 26 of head 11 by bevelled walls 27 of fairly substantial size, the bevelled walls 27 extending at an angle of approximately 45 degrees.

Extending parallel to the side walls 16 and 17 are stepped-back vertical walls 28 providing recessed tool receiving floors 30, it being intended that most tools except for the cutting-off tool 23 will be supported on one or the other of the floors 30 and be clamped against the stepped-back vertical wall 28.

Extending vertically through the head 11 within the V formed by walls 28 is a threaded aperture 31 threaded to cooperate with the clamp screw 14.

The clamp 13 has a front vertical wall 32 ending in an angular toe 33 which is connected by an interior wall 34 extending at right angles to the bottom wall 35 of the clamp 13. At its other end the bottom wall 35 is joined by a wall here shown as vertical at 36 to a bevelled wall 37 extending at 45° to the floor 35 and to the vertical rear wall 38 of this bevelled toe 40. It will be noted that the angle of 45° of the bevelled wall 37 of toe 40 is complementary to the bevelled walls 27 of the head 11. A top wall 41 connects the bevelled toe wall 38 at the rear to the front wall 32 and extending through this top wall 41 through the bottom wall 35 is an elongated slot 42 of somewhat greater width than the diameter of the threaded aperture 31 and of substantially greater length than such diameter thus permitting a substantial adjustment of the clamp 13 relative to the head 11 while being secured thereto firmly in position according to the size of tool secured thereby by means of the clamping screw 14 and the washer 15 extending over the slot 42 underneath the clamping screw head 43.

Figure 4:
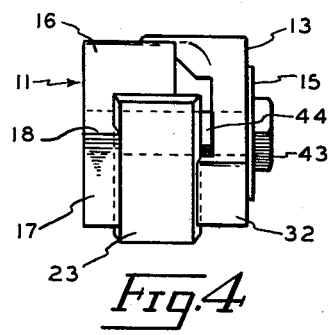
Fig. 4 is a front elevational view of the head end of the tool of Figs. 1 and 2, turned on its side.
Figure 5:
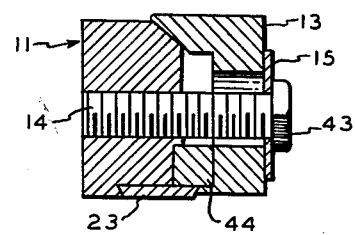
Fig. 5 is a sectional view on line 5—5 of Fig. 1.

In operation practically every type of machine tool bit may be secured in either right hand or left hand position except for the cutting-off tool bit which has its special securing means as shown in Figs. 1, 2, 4 and 5 which shows the cutting-off tool 23 as secured against the vertical wall 21 by means of the angular step 29 on one edge and the angular edge 33 of clamp 13. In addition, a backing block 44 may be used when mounting the cutting-off tool 23 as shown in Figs. 1 and 5, this backing block 44 being of appropriate size and may be one of the tool bits otherwise usable by itself for the purpose according to which its particular machine bit may be desired. In any case, the various tool bits, except for the cutting-off tool 23 whether circular in cross-section as shown at 45 in Figs. 3 and 6 or square in cross-section as shown at 44 or 46 or even though rectangular in cross-section (in which case the foot must be blocked up at 27) within the limits of the size of the tool are all secured with either four line contact or four surface contact as shown in Figs. 5, 6 and 7. Two lines or two surfaces of contact are provided by the stepped floor 30 of the tool holder head 11 and the other lines or two surfaces of contact are provided by the lower floor 35 and either the inside vertical wall 34 of the front step 33 or by the edge between the angular step 33 and such front wall 34. The angular wall 37 of bevelled toe 40 of clamp 13 adjustably cooperates with this complementary angular wall 27 on the tool holder head 11 adjusting itself to the thickness or diameter of the tool bit secured between the clamp and the head, this adjustment being provided as a result of the elongated slot 42 through which the clamp screw 14 extends. Due to the fact that the slot 42 is wider than the diameter of the clamp screw 14 natural adjustment is also provided permitting the clamp 13 to adjust itself somewhat toward the bit point and away from the holder shank 12 thus providing greater leverage at the bit point. It is as a result of this adjustability due to the cooperating bevelled walls and the elongated slot that it is possible to use this one size of holder tool for a number of different sized or shaped tool bits and yet provide firm support for the various tool bits as contrasted with the prior art including that listed, wherein several tool holders must be provided in order to support different sizes of tool bits if a firm four line or four surface contact and support is desired.

It is the cooperation of the complementary ledges, provided by the depressed floor 30 and stepped back wall 28 of the head and by the inside corner at the front toe of the clamp, that enables four line or four surface secure contact to be provided, and the complementary bevelled walls on the opposite side of the head and of the clamp that keep these ledges in proper relationship to each other as the clamp is tightened by the clamp screw 14, thus enabling various sized tools to be mounted in this same one holder.

While the device has been shown and the structure described in detail, it is obvious that this invention is not to be considered as being limited to the exact form disclosed, and that changes in detail and construction may be made therein within the scope of what is claimed, without departing from the spirit of this invention.

Having thus set forth and disclosed the nature of this invention, what is claimed is:

1. A lathe tool holder comprising a shank having integral therewith a head provided with oppositely disposed bevelled walls and forwardly located vertical walls disposed at an angle to each other, a top floor on said head having recessed ledges therein extending parallel to said forwardly disposed vertical walls, said floor ledges having a vertical wall spaced from the vertical wall of the head, said head having a vertical aperture therein for cooperation with a securing means, and a clamp arranged to be secured on said head, securing means for holding said clamp to said head, said clamp having a bevelled foot at one end thereof, the angle of said bevelled foot being complementary to the angle of the bevelled walls of said tool holder head, a vertically depending toe at the opposite end of said clamp and a lower floor on said clamp extending from said vertically extending toe toward said bevelled foot thereby providing a right angular ledge complementary to the ledges on said tool head, and an elongated slot through said clamp through which said securing means extends to said securing aperture in said head, said bevelled foot of said clamp cooperating with one of said bevelled walls of said tool holder head as said clamp is secured by said securing means to grip a tool bit in at least four line contact between said ledge of said clamp and one of said ledges of said tool holder head.

2. A lathe tool holder comprising a shank having integral therewith a head provided with oppositely disposed bevelled walls and forwardly located vertical walls disposed at an angle to each other, a top floor on said head having recessed ledges therein extending parallel to said forwardly disposed vertical walls, said floor ledges having a vertical wall spaced from the vertical wall of the head, said head having a vertical aperture therein for cooperation with a securing means, and a clamp arranged to be secured on said head, securing means for holding said clamp to said head, said clamp having a bevelled foot at one end thereof, the angle of said bevelled foot being complementary to the angle of the bevelled walls of said tool holder head, a vertically depending toe at the opposite end of said clamp and a lower floor on said clamp extending from said vertically extending toe toward said bevelled foot thereby providing a right angular ledge complementary to the ledges on said tool head, and an elongated slot through said clamp through which said securing means extends to said securing aperture in said head, said bevelled foot of said clamp cooperating with one of said bevelled walls of said tool holder head as said clamp is secured by said securing means to grip a tool bit in at least four line contact between said ledge of said clamp and one of said ledges of said tool holder head, the lower edge of said vertical toe of said clamp being provided with a slightly angular surface inclined inwardly toward said clamp, one of said forward vertical side walls of said tool holder head having a second ledge cut therein consisting of a parallel vertical wall and an inclined floor surface forming an acute angle therewith whereby an appropriately shaped cutting-off tool may be secured against said latter vertical wall and inclined floor and against the inclined surface of said clamp toe.

3. A tool holder of the character described comprising a shank, the forward end of which terminates in an integral head, said head including a pair of oppositely disposed rearwardly extending bevelled walls adjacent said shank, a pair of forwardly disposed vertical walls meeting at an angle to each other, a pair of intersecting ledges on the top of said head, said ledges having floors at right angles to said forwardly vertical walls and having vertical walls parallel to said first mentioned vertical walls and at right angles to said ledge floors, a clamp for cooperating with said tool holder head and securing a tool bit on either of said ledges, said clamp having a vertically depending toe at one end thereof providing a right angular ledge complementary to either of said tool holder head ledges and a bevelled foot at the other end thereof having an angular surface complementary to the angle of the bevelled walls at the rear of said tool holder head, said clamp having an elongated enlarged slot therein through which a clamp screw may be fastened into a threaded aperture in said head to secure said clamp with its bevelled foot cooperating with one of said bevelled surfaces of said holder head and its ledge embracing a tool bit in cooperation with one of said ledges of said tool holder head.

4. A lathe tool holder for securely and interchangeably holding a variety of sizes and shapes of tool bits, said tool holder comprising a shank having an integrally extending arrow-shaped head at one end thereof, a pair of intersecting ledges provided in the top surface of said arrow-shaped head and meeting at the forward point thereof, said ledges having horizontal floors and vertical walls and a pair of bevelled surfaces on said head on the opposite sides from said ledges, said head having a threaded aperture therethrough, a cooperating clamp having a ledge adjacent one end of its bottom complementary to the ledges of said head and a bevelled toe adjacent the other end of the bottom of said clamp complementary to the bevelled surfaces of said head, said clamp having an elongated slot extending therethrough and a clamp screw arranged to extend through said elongated slot into said threaded aperture of said head to hold a tool bit between said clamp ledge and one of said tool head ledges in at least four line contact while its bevelled foot cooperates with a bevelled surface of said head.

5. A lathe tool holder comprising a shank, a head integrally extending from said shank, a ledge provided in the top surface of said head, said ledge having a vertical wall at right angles to a horizontal floor, and a bevelled surface on said head opposite to said ledge, a clamp having a ledge complementary to said ledge on said tool holder head and an oppositely disposed bevelled foot complementary to said bevelled surface of said tool holder head, an elongated slot extending through said clamp between said ledge and said bevelled foot and securing means extending into said tool holder head through said elongated slot of said clamp for securing said clamp and a tool bit held thereby between said clamp ledge and said head ledge.

CARL M. RHODIN.

REFERENCES CITED

The following references are of record in the file of this patent:

UNITED STATES PATENTS

| Number | Name | Date |
| --- | --- | --- |
| 861,768 | Remaberg | July 30, 1907 |
| 1,250,154 | Ellis | Dec. 18, 1917 |
| 1,268,623 | Henry | Dec. 3, 1918 |
| 1,336,155 | Presby | Apr. 6, 1920 |